United States Patent Office 3,245,992
Patented Apr. 12, 1966

3,245,992
PHENOXY-, PHENYLTHIO- AND PHENYLAMINO-1,3,5-TRIAZINES
Martin Dexter, Briarcliff Manor, Martin Knell, Ossining, and Eric A. Roskin, Bronx, N.Y., assignors to Geigy Chemical Corporation, Greenburgh, N.Y., a corporation of Delaware
No Drawing. Filed July 20, 1965, Ser. No. 473,478
4 Claims. (Cl. 260—248)

This application is a continuation-in-part of copending application Serial No. 361,533, filed April 21, 1964, now allowed, which in turn is a continuation-in-part of copending application Serial No. 87,520, filed February 21, 1961, now abandoned, which in turn is a continuation-in-part of copending application Serial No. 47,159, filed August 3, 1960, now abandoned, which in turn is a continuation-in-part of copending application Serial No. 21,604, filed April 12, 1960, now abandoned.

The compounds of this invention may be represented by the formula:

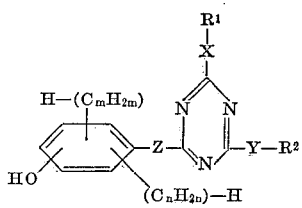

wherein each of $R^1$ and $R^2$ is either the group

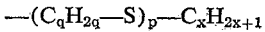

or the group

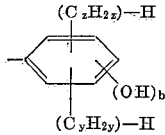

and each of X, Z and Y is either —O—, —S— or

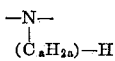

in which each of $n$, $m$, $z$ and $y$ has a value of from 0 to 12, each of $a$ and $x$ has a value of from 0 to 30, $q$ has a value of from 2 to 6, $p$ has a value of from 0 to 3, and $b$ has a value of from 0 to 1.

$R^1$ and $R^2$ may be alike or different and may be hydrogen, alkyl, alkylthio(lower)alkyl, alkylthio(lower)alkylthio(lower)alkyl or alkylthio(lower)alkylthio(lower)alkylthio(lower)alkyl. $R^1$ and $R^2$ may also be phenyl, mono(lower)alkylphenyl, di(lower)alkylphenyl, hydroxyphenyl, mono(lower)alkylhydroxyphenyl or di(lower)alkylhydroxyphenyl.

It will also be observed that in each instance the triazine compounds of the present invention possess a hydroxyphenyl group or alternatively, in the more preferred species, a mono or di(lower)alkylhydroxyphenyl group. The hydroxy group may be in the ortho, meta or para positions (with respect to the group joining the phenyl group to the triazine ring) although the para position is preferred. While the (lower)alkyl groups on this hydroxyphenyl group may be any saturated hydrocarbon having from one to six carbon atoms, the t-butyl group is especially preferred. Furthermore while one or two alkyl groups may be in any of the remaining four positions in the hydroxyphenyl group, it is generally desirable, if possible, for at least one and preferably both to be on the carbon atoms of the phenyl ring which are adjacent to the hydroxy group.

X, Y and Z may be alike or different and may be a divalent oxygen atom, a divalent sulfur atom, an imino group or an alkylimino group.

By the term "alkyl" is meant a branched or straight chained saturated hydrocarbon group of from one to about thirty carbon atoms. Representative of such groups are thus methyl, ethyl, propyl, isopropyl, butyl, s-butyl, t-butyl, pentyl, hexyl, octyl, decyl, dodecyl, tetradecyl, hexadecyl, octadecyl, eicosyl, docosyl, tetracosyl, hexacosyl, octacosyl, triacontyl and the like. When the term alkyl is qualified by the designation (lower), there is included branched or straight chained hydrocarbon groups of from one to about six carbon atoms; e.g., methyl, ethyl, propyl, isopropyl, butyl, s-butyl, t-butyl, pentyl, hexyl and the like.

Compounds falling within the above formula are surprisingly effective stabilizers of organic material normally subject to deterioration, presumably oxidative deterioration. Such material includes for example, synthetic organic polymeric substances such as vinyl resins formed by the polymerization of vinyl halides or from the copolymerization of vinyl halides with unsaturated polymerizable compounds, e.g., vinyl esters, α,β-unsaturated esters, α,β-unsaturated acids, α,β-unsaturated ketones or aldehydes and unsaturated hydrocarbons such as butadiene and styrene; poly-α-olefins such as polypropylene, polyethylene, polybuylene, polyisoprene and the like, including copolymers of poly-α-olefins; polyurethanes such as are prepared from polyols and organic polyisocyanates; polyamides such as poly(hexamethylene adipamide); polyesters such as poly(methylene terephthalates); polycarbonates; polyacetals; polystyrene; poly(ethylene oxide); copolymers such as those formed by the copolymerization of acrylonitrile, butadiene and/or styrene; as well as physical mixtures of the above such as high impact polystyrene containing copolymers of butadiene and styrene; and the like.

Other materials stabilized by the present invention include lubricating oils such as those of the aliphatic ester type, e.g., dihexyl azelate, di-(2-ethylhexyl)azelate, di-(3,5,5 - trimethylhexyl)glutarate, di-(3,5,5-trimethylpentyl)glutarate, di-(2-ethylhexyl)pimelate, di-(2-ethylhexyl)adipate, diisoamyl adipate, triamyl tricarballate, pentaerythritol tetracaproate, dipropylene glycol dipelargonate, 1,5-pentanediol di-(2-ethylhexanoate), and the like; fats and oils of animal and vegetable origin, e.g., linseed oil, menhaden oil, cod liver oil, castor oil, olive oil, rapeseed oil, coconut oil, palm oil, corn oil, sesame oil, peanut oil, cotton seed oil, butter, fat, lard, beef tallow and the like; saturated and unsaturated hydrocarbons such as for example, both natural and synthetic gasolines, jet fuels, diesel oils, mineral oils, fuel oils, drying oils, waxes and resins.

A particularly valuable class of organic materials stabilized by the compounds of the present invention are those of the group consisting of polypropylene, polyethylene, polystyrene, aliphatic aldehydes, aliphatic ester lubricants, fats, oils of animal origin, oils of vegetable origin, hydrocarbons boiling in the gasoline range, mineral oil and hydrocarbon wax.

By utilizing from about 0.001% to about 10% by weight, preferably from about 0.001% to about 5% by weight, of the compounds of this invention, such organic materials are stabilized during processing, e.g., milling of polypropylene, blow molding of polyethylene and during use. Such signs of oxidative deterioration as discolorization and embrittlement of polymers, gumming of hydrocarbons, spoilage of oils and fats and the like are thus substantially eliminated, reduced and/or retarded by the presence of a stabilizing amount of these compounds.

These compounds may be used singly, in combination with one another, or in conjunction with other additives such as antioxidants, pourpoint depressants, corrosion and rust inhibitors, dispersing agents, demulsifiers, antifoam agents, carbon black, accelerators, plasticizers, color stabilizers, heat stabilizers, ultraviolet adsorbers, dyes, pigments and the like. Not only are the functions of such additives unimpaired, they are often improved. Furthermore in certain instances, the addition of a so-called "synergist" such as dilaurylthiodipropionate, or similar sulfur-containing esters, greatly increases the stabilizing properties of these compounds. This is particularly evident with symmetrical compounds of the present invention such as 2,4,6 - tris - 4 - (hydroxy - 3,5 - di - t - butylphenoxy)- 1,3,5-triazine which falls within Formula V, infra.

Particularly valuable subclasses of compounds are those of Formulas II–VII below in which $m$ and $n$ are as defined for Formula I:

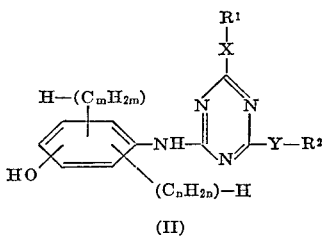

(II)

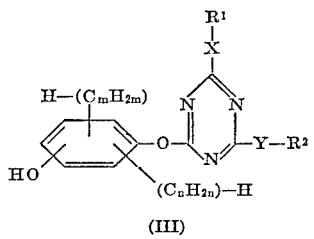

(III)

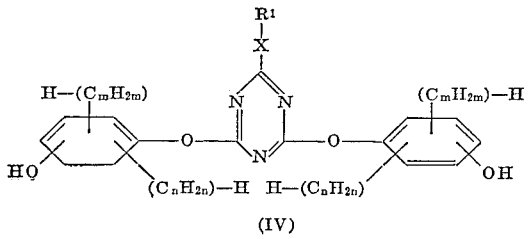

(IV)

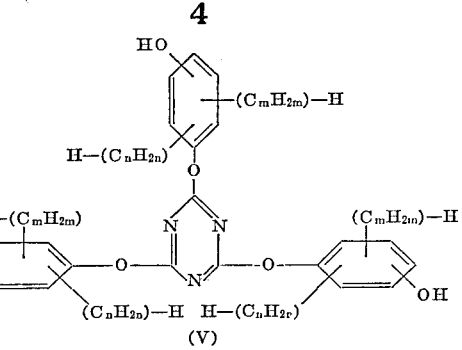

(V)

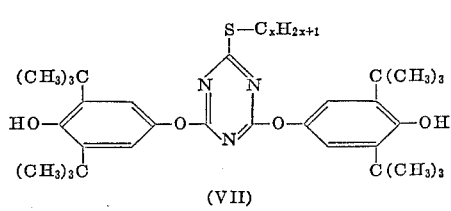

(VI)

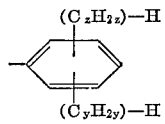

(VII)

wherein $R^1$ and $R^2$ are each

and each of X and Y is —O—, —S— or

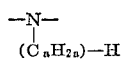

and wherein each of $n$, $m$, $z$ and $y$ has a value of from 0 to 12, and $a$ has a value of from 0 to 30.

The compounds of the present invention are preferably prepared from cyanuric chloride although triazine compounds having other reactive groups may alternatively be used. Depending upon the nature of the final compound, the preparation may entail only one step (as in the case of symmetrically substituted triazines) or two or three steps (as in the case of unsymmetrically substituted triazines). The number of different groups generally dictates the number of steps, each step involving the introduction of one or more like groups. When one or more of X, Y and Z is oxygen, a hydroxy compound is employed to react with one or more of the chlorine atoms of the triazine ring. When one or more of X, Y and Z is sulfur, a mercaptan may be employed to react with one or more chlorine atoms on the triazine ring. Similarly when one or more of X, Y and Z is imino, an amine is employed to react with one or more of the chlorine atoms on the triazine ring. Other variations are of course possible, such as reacting a halide with a mono, di or trimercaptotriazine. The number of groups introduced on any triazine intermediate having more than one chlorine atom present may be controlled as for example by limiting the quantities of reactants.

The following chart demonstrates some of the various alternative synthetic routes available, starting with cyanuric chloride (VIII) to various final compounds (IX–XVIII). In those instances in which two or more like groups are introduced all may of course be introduced in one step. In this schematic representation, R is a non-specific designation embracing $R^1$, $R^2$ (including hydrogen) and the hydroxyphenyl group of Formula I. It is also to be understood that the "H" of ROH and RSH may be replaced by sodium, potassium or another suitable halogen reactive group.

The following examples will further serve to typify and illustrate the nature of this invention but are not intended in any way as a limitation of the scope thereof. In these examples, parts are by weight unless otherwise

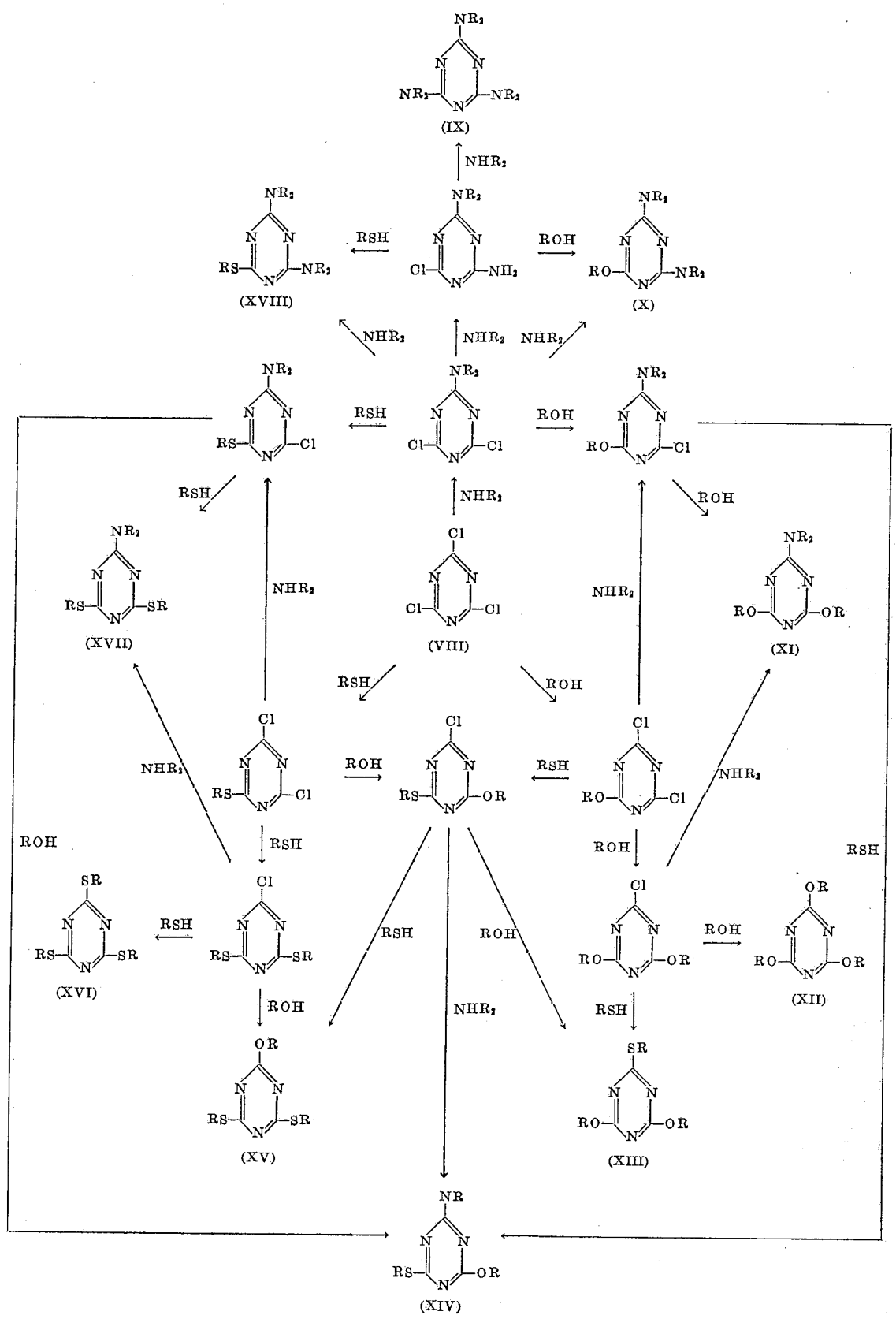

noted and the relationship of parts by weight to parts by volume is as that of grams to cubic centimeters. Temperature is expressed in degrees centigrade.

EXAMPLE 1

*6-(4-hydroxy-3,5-di-t-butylanilino)-2,4-bis-(n-octylthio)-1,3,5-triazine*

(a) *4 - nitroso - 2,6-di-t-butylphenol.*—Seven hundred and fifty parts by volume of ethanol, cooled at 15°, are saturated with hydrogen chloride gas and then diluted by the addition of 4000 parts by volume of ethanol. 2,6-di-t-butylphenol (824 parts) is dissolved in the alcoholic solution and a solution of sodium nitrite (304 parts in 400 parts by volume of water) is added at 15–20° over a period of one hour while stirring. Stirring is continued for another 2 hours, allowing the temperature to rise to room temperature. Two thousand parts by volume of water are then added. The product is collected by filtration and washed well with water. The filter cake is slurried in 3000 parts by volume of petroleum ether, filtered, washed on the filter with 1000 parts by volume of petroleum ether and dried in a vacuum oven at 70–80° to yield 4-nitroso-2,6-di-t-butylphenol, M.P. 219°.

(b) *4-amino-2,6 - di-t - butylphenol.*—4-nitroso-2,6-di-t-butylphenol (176 parts) is dissolved in 600 parts by volume of 5 N sodium hydroxide and 1200 parts by volume of water and a solution of sodium hydrosulfite (522 parts) in 2200 parts by volume of water is added with moderate speed (about 30 minutes), during which time the temperature rises to about 53°. After addition is complete, stirring is continued for 2½ hours. The product is rapidly collected by filtration, washed with 4000 parts by volume of water and dried in a vacuum desiccator over phosphoric anhydride to yield 4-amino-2,6-di-t-butylphenol, M.P. 105–108°.

(c) *6-(4-hydroxy-3,5 - di-t-butylanilino)-2,4-dichloro-1,3,5-triazine.*—A solution of cyanuric chloride (18.4 parts) in boiling acetone (100 parts by volume) is poured in a thin stream into 200 parts by volume of ice-water with stirring, maintaining the temperature of 0–5° with external cooling. 4-amino-2,6-di-t-butylphenol (22.1 parts) and 5.3 parts of sodium carbonate are then added and the reaction mixture stirred vigorously at 8–10° for 45 minutes. This mixture is then diluted by the addition of 100 parts by volume of acetone, with stirring continued for an additional hour at 8–10°. The suspension is then poured into 500 parts by volume of ice-water and the precipitate is filtered off and dried in vacuo to yield 6-(4 - hydroxy-3,5-di-t-butylanilino) - 2,4 - dichloro-1,3,5-triazine, M.P. 144°.

(d) *6-(4 - hydroxy-3,5-di-t-butylanilino) - 2,4 - bis-(n-octylthio)-1,3,5-triazine.*—An alcoholic solution of sodium n-octylmercaptide (prepared by dissolving 2.3 parts of sodium in 50 parts by volume of ethanol and addition 14.6 parts of n-octylmercaptan) is added rapidly with stirring to a solution of 18.5 parts of 6-(4-hydroxy-3,5-di-t-butylanilino)-2,4-dichloro-1,3,5-triazine in 150 parts by volume of ethanol. The reaction mixture is stirred at reflux for 1½ hours. After cooling to normal room temperature, 500 parts by volume of water are added. The precipitated product is separated by filtration and washed well with water. Purification of the product is accomplished by dissolving in 300 parts by volume of boiling ethanol, adding activated carbon, filtering and slowly recrystallizing. The white needles which form are collected by filtration, washed with cold ethanol and dried in vacuo to yield 6-(4-hydroxy-3,5-di-t-butylanilino)-2,4-bis-(n-octylthio)-1,3,5-triazine, M.P. 92–95°. Additional material having the same melting point may be obtained by concentration of the mother liquor.

By replacing n-octylmercaptan by ethylmercaptan, n-octadecylmercaptan, t-butylmercaptan and p-t-butylthiophenol respectively, the following compounds are obtained:

6-(4-hydroxy-3,5-di-t-butylanilino) - 2,4-bis-(ethylthio)-1,3,5-triazine, M.P. 89–90° (recryst. from petroleum ether)

6-(4-hydroxy-3,5-di-t-butylanilino) - 2,4-bis-(n-octadecylthio)-1,3,5-triazine, M.P. 86–88° (recryst. from ethanol and petroleum ether)

6-(4-hydroxy-3,5-di-t-butylanilino) - 2,4-bis-(t-butylthio)-1,3,5-triazine, M.P. 169–170° (recryst. from benzene and heptane)

6-(4-hydroxy-3,5 - di-t-butylanilino) - 2,4-bis-(p-t-butylphenylthio)-1,3,5-triazine, M.P. 87°.

EXAMPLE 2

*4,6-bis-(4-hydroxy-3,5-di-t-butylanilino)-2-n-octylthio-1,3,5-triazine*

(a) *4,6 - bis - (4 - hydroxy - 3,5 - di-t-butylanilino)-2-chloro-1,3,5-triazine.*—A solution of 4.6 parts of cyanuric chloride in 100 parts by volume of boiling acetone is poured in a thin stream into 200 parts by volume of ice-water while stirring, maintaining a temperature of 0–5° by means of external cooling. 4-amino-2,6-di-t-butyl-phenol (16.7 parts) and 6.3 parts of sodium bicarbonate are then added with vigorous stirring, the temperature being maintained at 10° for 45 minutes. The temperature is raised to 50° and held there for 45 minutes, and then to reflux for 45 minutes. The brown solid which precipitates is filtered off, washed well with water and petroleum ether and is finally recrystallized from dioxane-hexane (5:4) to yield 4,6-bis-(4-hydroxy-3,5-di-t-butylanilino)-2-chloro-1,3,5-triazine, M.P. 304° (dec.).

(b) *4,6-bis-(4 - hydroxy-3,5-di-t-butylanilino)-2- octylthio-1,3,5-triazine.*—An alcoholic solution of sodium n-octylmercaptide (prepared by dissolving 0.172 parts of sodium in 10 parts by volume of ethanol and adding 1.09 parts of n-octylmercaptan) is added to a suspension of 4.15 parts of 2,4-bis-(4-hydroxy-3,5-di-t-butylanilino)-6-chloro-1,3,5-triazine in 125 parts by volume of ethanol and this mixture then refluxed for 1 hour. The alcoholic solution is filtered hot to remove 1.2 parts of insoluble material and then flooded with 500 parts by volume of water. The solid material which forms is collected by filtration, washed with dilute aqueous sodium hydroxide and water and finally dried in vacuo to yield 4,6-bis-(4-hydroxy-3,5-di-t-butylanilino)-2-octylthio - 1,3,5-triazine, M.P. 55°.

By alternatively employing sodium p-octadecylphenyl mercaptide, there is obtained according to this procedure, 4,6 - bis - (4 - hydroxy - 3,5 - di - t - butylanilino) - 2 - p-octadecylphenylthio-1,3,5-triazine.

EXAMPLE 3

*6-(4-hydroxy-3,5-di-t-butylanilino)-2,4-bis-(phenylthio)-1,3,5-triazine*

A mixture of 11.1 parts of 6-(4-hydroxy-3,5-di-t-butylanilino)-2,4-dichloro-1,3,5-triazine, 6.6 parts of thiophenol and 4.74 parts of pyridine in 100 parts by volume of acetone is stirred at normal room temperature for 30 minutes, after which the reaction mixture is stirred at reflux for 1½ hours. After being cooled to normal room temperature, the pyridine hydrochloride which forms is removed by filtration and the filtrate flooded with water, causing the formation of a gummy precipitate. The supernatant liquid is decanted and the resulting viscous mass is boiled in ethanol (100 parts by volume). The yellow crystals which form upon cooling are collected by filtration, washed with ethanol and dried in vacuo, to yield 6 - (4 - hydroxy - 3,5 - di - t - butylanilino) - 2,4 - bis-(phenylthio)-1,3,5-triazine, M.P. 169–170°. Additional material may be obtained by chilling the mother liquor.

In a similar fashion, 12.8 parts of 6-(4-hydroxyanilino)-2,4-dichloro-1,3,5-triazine are allowed to react with a solution of 11 parts of thiophenol, in 150 parts by volume of acetone and 7.9 parts of pyridine in 25 parts by volume of acetone. After flooding with water, the gummy precipitate solidifies upon trituration with water and standing. This solid is purified by redissolving in base and subsequently treating with activated carbon. The purified solution, after filtration, is neutralized with dilute hydrogen chloride, and the precipitate collected and dried to yield 6-(4-hydroxyanilino)-2,4-bis-(phenolthio)-1,3,5-triazine, M.P. 72–78°.

The starting compound 6-(4-hydroxyanilino)-2,4-dichloro-1,3,5-triazine is prepared by reacting cyanuric chloride with 4-aminophenol in a manner analogous to the preparation described in Example 1(c).

EXAMPLE 4

*6-(4-hydroxy-3,5-di-t-butylanilino)-2,4-bis-(anilino)-1,3,5-triazine*

A cold (−5°) solution of 14.75 parts of 6-(4-hydroxy-3,5-di-t-butylanilino-2,4-dichloro-1,3,5-triazine and 7.6 parts of aniline in 100 parts by volume of acetone is allowed to slowly attain a temperature of 25° while maintaining a pH of between 7 and 8 by the addition of 5 N sodium hydroxide. When the pH is constant, 200 parts by volume of water are added and the reaction mixture is heated to boiling, allowing the acetone to distill off, the pH being kept between 7 and 8 by addition of 5 N sodium hydroxide. After the theoretical amount of alkali has been added and the pH remains at 7, the mixture is heated at reflux for an additional 45 minutes. The solid obtained is collected by filtration of the hot suspension, washed well with water, air dried and finally triturated with hexane and redried to yield 6-(4-hydroxy-3,5-di-t-butylanilino)-2,4-bis-(anilino)1,3,5-triazine as a white solid, M.P. 192–194°. Further purification may be accomplished by recrystallization from isopropyl alcohol.

EXAMPLE 5

*6-(4-hydroxy-3,5-di-t-butylanilino)-2,4-bis-(n-octylamino)-1,3,5-triazine* n-Octylamine (12.9 parts), 18.5 parts of 6-(4-hydroxy-3,5-di-t-butylanilino)-2,4-dichloro-1,3,5-triazine and 5.3 parts of sodium carbonate are added to 200 parts by volume of water. The mixture is heated at reflux for ½ hour and methyl Cellosolve (200 parts by volume) is then added with reflux being continued for an additional 6 hours. Three hundred parts by volume of water are then added. Upon standing, an oily layer separates and becomes a thick resinous mass. One hundred parts by volume of 5 N hydrochloric acid are added and the product extracted with ether. The resultant ethereal solution is washed with water, dilute sodium hydroxide and again with water and then dried over anhydrous sodium sulfate, filtered, and evaporated to yield 6-(4-hydroxy-3,5-di - t - butylanilino) - 2,4 - bis - (n - octylamino) - 1,3,5-triazine, M.P. 42–45°.

EXAMPLE 6

*6-(4-hydroxy-3,5-di-t-butylanilino)-2,4-bis-(phenoxy)-1,3,5-triazine*

A solution of 7.36 parts of 6-(4-hydroxy-3,5-di-t-butylanilino)-2,4-dichloro-1,3,5-triazine in 50 parts by volume of ethanol is added to a stirred alcoholic solution of sodium phenoxide (prepared by dissolving 0.92 part of sodium in 25 parts by volume of ethanol and adding 3.76 parts of phenol). After the exothermic reaction has subsided, the reaction mixture is heated at reflux for 2 hours. The sodium chloride is removed by filtration and the filtrate flooded with water to produce a gummy yellow solid which, on trituration with petroleum ether, yields a white solid. This is recrystallized from methanol-water (5:1) to yield 6-(4-hydroxy-3,5-di-t-butylanilino)-2,4-bis-(phenoxy)-1,3,5-triazine, M.P. 160–161°.

EXAMPLE 7

*6 - (4 - hydroxy - 3,5-di-t-butylanilino)-2,4-bis-(ethoxy)-1,3,5-triazine*

A solution of 10 parts of 6-(4-hydroxy-3,5-di-t-butylanilino)-2,4-dichloro-1,3,5-triazine in 25 parts by volume of ethanol is added rapidly with stirring to a solution of 1.24 parts of sodium in 50 parts by volume of ethanol. The reaction mixture is stirred at reflux for 1 hour after which, the sodium chloride which forms is removed by filtration. The filtrate is purified with active carbon, filtered and flooded with water. The oil which forms is separated and extracted with ether and these extracts are dried over anhydrous magnesium sulfate and evaporated. When the last traces of solvent are removed under high vacuum, the residue solidifies to yield 6-(4-hydroxy-3,5-di-t -butylanilino)-2,4-bis-(ethoxy)-1,3,5-triazine, M.P. 54°.

EXAMPLE 8

*6 - (4 - hydroxy - 3,5 - di-t-butylanilino)-2,4-bis-(n-octyloxy)-1,3,5-triazine*

Ten parts of 6-(4-hydroxy-3,5-di-t-butylanilino)-2,4-dichloro-1,3,5-triazine are added to a solution of 1.24 parts of sodium in 50 parts by volume of n-octyl alcohol while stirring. An exothermic reaction ensues and the temperature is not allowed to rise above 60°. Stirring is continued at 60° for 15 minutes and the excess octyl alcohol is then removed by distillation under high vacuum with a maximum bath temperature of 95°. The product obtained as a resinous oil is purified by dissolution in hexane and by placing the solution on a silica gel column, eluting first with hexane-benzene (1:1) and then with benzene. 6 - (4 - hydroxy - 3,5 - di-t-butylanilino)-2,4-bis-(n-octyloxy)-1,3,5-triazine, a resinous oil, is isolated by evaporation of the benzene eluate.

Calc. for $C_{33}H_{56}O_4N_4$: C, 71.19; H, 10.14; N, 10.05. Found: C, 71.13; H, 10.12; N, 10.07.

EXAMPLE 9

*6 - (2 - hydroxy - 3 - t-butyl-5-methylanilino)-2,4-bis-(n-octylthio)-1,3,5-triazine*

(a) *2,4 - bis - (n - octylthio)-6-chloro-1,3,5-triazine.*— A solution of 36.8 parts of cyanuric chloride, 58.4 parts of n-octylmercaptan and 0.3 part by volume of pyridine in 100 parts by volume of xylene is refluxed for 6 hours, with nitrogen being passed through the reactants, until the evolution of hydrogen chloride has ceased. The solution is separated by filtration from a small amount of insoluble material, the solvent removed under vacuum, and the residue then vacuum distilled to yield 2,4-bis-(n-octylthio)-6-chloro-1,3,5-triazine, B.P. 206–208°/0.075 mm.

(b) *6 - (2 - hydroxy - 3 - t-butyl-5-methylanilino)-2,4-bis-(n-octylthio)-1,3,5-triazine.*—A mixture of 10.1 parts of 6-chloro-2,4-bis-(n-octylthio)-1,3,5-triazine, 4.7 parts of 2-amino-4-methyl-6-t-butylphenol and 100 parts by volume of water is gradually warmed with stirring under a nitrogen atmosphere to 70°, maintaining the pH at 7–8 by the addition of 5 N aqueous sodium hydroxide. When the pH remains constant, the oily layer is extracted with ether and these extracts dried over anhydrous magnesium sulfate. The magnesium sulfate is removed by filtration and the filtrate evaporated. The residue is purified by dissolving in petroleum ether, placing the solution on a silica gel chromatographic column, and eluting with benzene. After removal of the benzene, 6-(2-hydroxy-3-t-butyl-5-methylanilino) - 2,4-bis-(n-octylthio)-1,3,5-triazine is obtained as a resinous oil.

Calc. for $C_{30}H_{50}N_4S_2O$: C, 65.91; H, 9.22; N, 10.24. Found: C, 66.06; H, 9.24; N, 10.45.

In a similar manner, 6 - (4 - hydroxy - 3,5-di-isopropylanilino)-2,4-bis-(n-octylthio)-1,3,5-triazine is prepared by substituting 4-amino-2,6-di-isopropylphenol [prepared by the method described for the preparation of 4-amino-2,6- di-t-butylphenol in Example 1(a) through (b)] for the 2-amino-4-methyl-6-t-butylphenol. This product is also obtained as a resinous oil.

Calc. for $C_{30}H_{52}ON_4S_2$: C, 66.37; H, 9.35; N, 9.99. Found: C, 66.06; H, 9.17; N, 10.27.

In a similar fashion, 6-(4-hydroxy-3-methyl-5-t-butylanilino)-2,4-bis-(n-octylthio)-1,3,5-triazine is prepared by substituting 4-amino-2-methyl-6-t-butylphenol [prepared by the method described for the preparation of 4-amino-2,6-di-t-butylphenol in Example 1(a) through (b)] for the 2-amino-4-methyl-6-t-butylphenol. This product is also obtained as a resinous oil.

Calc. for $C_{30}H_{50}N_4S_2O$: C, 65.91; H, 9.22; N, 10.24. Found: C, 66.07; H, 8.87; N, 10.40.

Likewise, 6 - (4 - hydroxyanilino)-2,4-bis-(n-octylthio)-1,3,5-triazine is prepared by substituting p-aminophenol for the 2-amino-4-methyl-6-t-butylphenol. The product is a solid and in place of chromatography, the product is recrystallized from petroleum ether, M.P. 62–63°.

In a similar manner, 6 - (4 - hydroxy-3,5-di-methylanilino) - 2,4 - bis - (n - octylthio)-1,3,5-triazine is prepared by substituting 4-amino-2,6-dimethylphenol [prepared by nitrosation of 2,6-dimethylphenol as in Example 1(a) and catalytic reduction using palladium on carbon catalyst] for the 2-amino-4-methyl-6-t-butylphenol. The product is a solid and in place of chromatography, the product is recrystallized twice from petroleum ether, M.P. 70–71°.

EXAMPLE 10

*6-(4-hydroxy-3,5-di-t-butylanilino)-2,4-bis-(n-octylthioethylthio)-1,3,5-triazine*

An alcoholic solution of sodium n-octylthioethylmercaptide prepared by dissolving 0.92 parts of sodium in 20 parts by volume of ethanol and adding 8.58 parts of n-octylthioethylmercaptan [prepared according to the method described by Reid, "Organic Chemistry of Bivalent Sulphur," Chemical Publishing Co., New York, N.Y., 1958, p. 394] is added with stirring to a slurry of 7.38 parts of 6-(4-hydroxy-3,5-di-t-butylanilino)-2,4-dichloro-1,3,5-triazine in 20 parts by volume of ethanol. After the exothermic reaction has subsided, the reaction mixture is heated at steam bath temperature for 1 hour, cooled to room temperature and filtered. Upon standing overnight, the product crystallizes from the filtrate to yield 6-(4-hydroxy-3,5-di-t-butylanilino)-2,4-bis-(n-octylthioethylthio)-1,3,5-triazine, which after recrystallization from hexane, is a waxy solid, M.P. 69–71°. Additional material is obtained by careful addition of water to the mother liquor until crystallization occurs.

EXAMPLE 11

*6-(4-hydroxy-3,5-di-t-butylanilino)-2,4-bis-(4-t-butylphenoxy)-1,3,5-triazine*

An alcoholic solution of sodium p,t-butylphenoxide (prepared by dissolving 9.2 parts of sodium in 750 parts by volume of ethanol and adding 60 parts of p,t-butylphenol) is added rapidly with stirring to a slurry of 74 parts of 6-(4-hydroxy-3,5-di-t-butylanilino)-2,4-dichloro-1,3,5-triazine in 250 parts of ethanol. After the exothermic reaction subsides, the reaction is allowed to stand for several hours and then poured into 2000 parts of water. The gummy solid is separated by filtration and recrystallized from methanol-water (100:7) to yield 6-(4-hydroxy - 3,5 - di - t - butylanilino) - 2,4 - bis - (4 - t-butylphenoxy)-1,3,5-triazine, M.P. 119–121°.

By replacing p,t-butylphenol by p,t-octylphenol in this procedure, there is obtained 6-(4-hydroxy-3,5-di-t-butylanilino) - 2,4 - bis - (4 - t - octylphenoxy) - 1,3,5 - triazine, M.P. 99–101° (recrystallized from methanol).

If sodium p-octadecylphenolate is substituted for sodium p,t-butylphenoxide in this example, there is obtained 6 - (4 - hydroxy - 3,5 - di - t - butylanilino) - 2,4 - bis-(p-octadecylphenoxy)-1,3,5-triazine.

If sodium methylmercaptide is substituted for sodium p,t-butylphenolate in this example, there is obtained 6-(4-hydroxy - 3,5 - di - t - butylanilino) - 2,4 - bis - (methylthio)-1,3,5-triazine.

EXAMPLE 12

*6-(4-hydroxy-5-methylanilino)-2,4-bis-(n-octylthio)-1,3,5-triazine*

A mixture of 10.1 parts of 2,4-bis-(n-octylthio)-6-chloro-1,3,5-triazine, 3.08 parts of 2-methyl-4-aminophenol and 100 parts of water is gradually warmed with stirring under a nitrogen atmosphere to 90°, the pH being maintained at 6–7 by the addition of 5 N sodium hydroxide. When the pH is constant, the reaction is complete. The product is collected by filtration, washed with water and purified by recrystallization from hexane to yield 6 - (4 - hydroxy - 5 - methylanilino) - 2,4 - bis - (n-octylthio)-1,3,5-triazine, M.P. 67–68°.

In place of 2-methyl-4-aminophenol the following compounds are employed in equivalent amounts: 2-amino-4-methylphenol, m-aminophenol, p-methylaminophenol sulfate, o-aminophenol, 2-t-butyl-4-aminophenol, 3,5-dimethyl-4-aminophenol, 2-amino-4,6-di-t-butylphenol and 2-amino-4-t-butylphenol. The following compounds are thus respectively obtained:

6-(2-hydroxy-5-methylanilino)-2,4-bis-(n-octylthio)-1,3,5-triazine, M.P. 99–101° (recryst. from ethanol and heptane);

6-(3-hydroxyanilino)-2,4-bis-(n-octylthio)-1,3,5-triazine, M.P. 55–57° (recryst. from petroleum ether);

6-(4-hydroxy-N-methylanilino)-2,4-bis-(n-octylthio)-1,3,5-triazine, M.P. 55–57° (recryst. from hexane, heptane and petroleum ether);

6-(2-hydroxyanilino)-2,4-bis-(n-octylthio)-1,3,5-triazine, M.P. 103° (recryst. from benzene-hexane and methanol-water);

6-(4-hydroxy-5-t-butylanilino)-2,4-bis-(n-octylthio)-1,3,5-triazine, M.P. 75° (isolated by elution chromatography using a silica gel column, then recryst. from petroleum ether);

6-(4-hydroxy-2,6-dimethylanilino)-2,4-bis-(n-octylthio)-1,3,5-triazine, M.P. 122–123° (recryst. from heptane);

6-(2-hydroxy-3,5-di-t-butylanilino)-2,4-bis-(n-octylthio)-1,3,5-triazine, M.P. 74° (recryst. from ethanol-water and methanol); and 6-(2-hydroxy-5-t-butylaninlino)-2,4-bis-(-octylthio)-1,3,5-triazine, M.P. 101° (recryst. from methanol).

If 3-octadecyl-4-aminophenol is substituted for 2-methyl-4-aminophenol in this example, there is obtained 6 - (4 - hydroxy - 2 - octadecylanilino) - 2,4 - bis - (n-octylthio)-1,3,5-triazine.

EXAMPLE 13

*6-(4-hydroxy-3,5-di-t-butylphenylthio)-2,4-bis-(n-octylthio)-1,3,5-triazine*

An alcoholic solution of sodium 4-hydroxy-3,5-di-t-butylphenylmercaptide (prepared by dissolving 23 parts of sodium in 2000 parts by volume of ethanol and adding 238 parts of 4-mercapto-2,6-di-t-butylphenol [Hotelling et al., J. Org. Chem. 24, 1958 (1959)]) is added with stirring to a solution of 404 parts of 2,4-bis-(n-octylthio)-6-chloro-1,3,5-triazine in 2000 parts by volume of ethanol. After the exothermic reaction has subsided, the reaction is allowed to stand at normal room temperature for several hours. The solid is removed by filtration and the ethanol removed from the filtrate by evaporation. The oily residue is then dissolved in hexane and adsorbed on a silica gel column. After removing impurities by elution with hexane, the product, 6-(4-hydroxy-3,5-di-t-butylphenylthio)-2,4-bis-(n-octylthio)-1,3,5-triazine is eluted with 50% by volume of benzene-hexane and isolated by evaporation of the solvent.

Calc. for $C_{33}H_{55}ON_3S_3$: C, 65.4; H, 9.15; N, 6.93; S, 15.88. Found: C, 65.29; H, 9.15; N, 6.73; S, 16.16.

By replacing 4-mercapto-2,6-di-t-butylphenol with 4-mercapto-2,6-dimethylphenol [Hotelling et al., J. Org. Chem. 24, 1958 (1959)], 6-(4-hydroxy-3,5-dimethylphenylthio)-2,5-bis-(n-octylthio)-1,3,5-triazine is obtained (isolated by elution chromatography using a silica gel column and eluting with 75% by volume benzene-hexane).

Calc. for $C_{27}H_{43}ON_3S_3$: C, 62.15; H, 8.31; N, 8.05; S, 18.44. Found: C, 62.13; H, 7.93; N, 7.63; S, 18.37.

In an analogous fashion, 6-(4-hydroxy-3,5-di-t-butylanilino)-2,4-bis-(2,3-dimethylphenylthio)-1,3,5 - triazine is obtained which when 7.4 parts of 6-(4-hydroxy-3,5-di-t-butylanilino)-2,4-dichloro-1,3,5-triazine in 100 parts by volume of ethanol are mixed with 8.4 parts of 2,3-dimethylbenzenethiol (66% pure oil) and 0.92 part of sodium dissolved in 50 parts by volume of ethanol. The resultant mixture is allowed to stand for 2 hours, after which the salt which forms is removed by filtration and the filtrate treated with steam to remove volatiles, including ethanol. The residual oil solidifies and the aqueous layer is decanted. This solid is dissolved in petroleum ether and the resultant mixture dried over magnesium sulfate. Upon evaporation of the petroleum ether, 6-(4-hydroxy-3,5-di-t-butylanilino)-2,4-bis-(2,3-dimethylphenylthio) - 1,3,5-triazine is obtained, and further purified by dissolution in hexane and chromatography on a silica gel column using 50% benzene-hexane as the eluant.

Calc. for $C_{33}H_{40}N_4SO_2$: C, 69.2; H, 7.04; N, 9.78; S, 11.19. Found: C, 69.52; H, 7.6; N, 9.65; S, 11.62.

EXAMPLE 14

*6-(4-hydroxy-3,5-di-t-butylphenoxy)-2,4-bis-(n-octylthio)-1,3,5-triazine*

An alcoholic solution of sodium 4-hydroxy-3,5-di-t-butylphenoxide, prepared by dissolving 60 parts of sodium in 5000 parts by volume of ethanol and adding 666 parts of 2,6-di-t-butylhydroquinone, is added rapidly to a stirred solution of 1212 parts of 2,4-bis-(n-octylthio)-6-chloro-1,3,5-triazine in 2500 parts by volume of ethanol. After the exothermic reaction subsides, the reaction mixture is allowed to stand several hours and the solid then removed by filtration. The filtrate is clarified with activated carbon, filtered and concentrated to dryness under vacuum. The oily residue thus obtained is dissolved in hexane, adsorbed on a silica gel column and eluted with 50% benzene-hexane to yield 6-(4-hydroxy-3,5-di-t-butylphenoxy)-2,4-bis-(n-octylthio)1,3,5-triazine as a light colored viscous oil.

Calc. for $C_{33}H_{55}O_2N_3S_2$: C, 67.19; H, 9.4; N, 7.12. Found: C, 66.84; H, 9.11; N, 7.26.

By replacing the 2,6-di-t-butylhydroquinone with hydroquinone, the chromatographic separation is unnecessary, the crude reaction product being precipitated by the addition of water. Fractional crystallization from ethanol separates two products, the latter of which is 6-(4-hydroxyphenoxy)-2,4-bis-(n-octylthio) - 1,3,5 - triazine, M.P. 79–80°.

Similarly by employing 2-t-butyl-6-methylhydroquinone and 2-methylhydroquinone in the foregoing procedure, there are respectively obtained 6-(4-hydroxy-3-methyl-5-t-butylphenoxy) - 2,4-bis-(n-octylthio)-1,3,5-triazine, M.P. 61–63°, and 6-(4-hydroxy-3-methylphenoxy)-2,4-bis-(n-octylthio)-1,3,5-triazine, M.P. 56–59°.

Compounds of the type herein exemplified can also be advantageously prepared by first treating cyanuric chloride with one equivalent of the appropriate hydroquinone or derivative thereof and thereafter introducing two equivalents of the appropriate mercaptan.

EXAMPLE 15

*2,4-bis-(4-hydroxy-3,5-di-t-butylphenoxy)-6-n-octylthio-1,3,5-triazine*

(a) *2,4-dichloro-6-n-octylthio-1,3,5-triazine.*—A solution of 184.4 parts of cyanuric chloride, 146 parts of n-octylmercaptan and 0.5 part by volume of pyridine in 500 parts by volume of xylene is refluxed while passing nitrogen through the reactants until the evolution of hydrogen chloride has ceased. The solution is then filtered from a small amount of insoluble material and the solvent removed under vacuum. Vacuum distillation of the residue yields 2,4-di-chloro-6-(n-octylthio)-1,3,5 - triazine, B.P. 147–148°/0.050 mm.

(b) *2,4-bis-(4-hydroxy-3,5-di-t-butylphenoxy)-6 - (n-octylthio)-1,3,5-triazine.*—To a vigorously stirred solution of 8.82 parts of 2,4-dichloro-6-(n-octylthio)-1,3,5-triazine and 13.32 parts of 2,6-di-t-butyl-1,4-hydroquinone in 50 parts by volume of ethanol is added dropwise a solution of 1.38 parts of sodium in 100 parts by volume of ethanol over a period of 30 minutes. The reaction mixture is refluxed for an additional 30 minutes, cooled and filtered. The filtrate is reheated to boiling and 20 parts by volume of water are added. Upon cooling the product which crystallizes is collected by filtration and dried to yield 2,4-bis-(4-hydroxy-3,5-di-t-butylphenoxy)-6-(n-octylthio)-1,3,5-triazine, M.P. 129–134°. Recrystallization from ethanol-water raises the melting point to 133–134°.

If 5.88 parts of 2,4-dichloro-6-(n-octylthio)-1,3,5-triazine are reacted with 6.64 parts of mono-t-butyl-1,4-hydroquinone in an analogous manner to the preparation described in this example, then 2,4-bis-(4-hydroxy-3-t-butylphenoxy)-6-n-octylthio-1,3,5-triazine is produced. This product is isolated by elution chromatography on a silica gel column using benzene as eluant. Upon evaporation of the solvent, the product is obtained as a hard glass.

Calc. for $C_{31}H_{43}O_4N_3S$: C, 67.25; H, 7.83; N, 7.59. Found: C, 67.01; H, 7.82; N, 7.95.

Similarly by employing two molar equivalents of 2-methyl-6-t-butylhydroquinone in place of 2,6-di-t-butylhydroquinone, there is obtained 2,4-bis-(4-hydroxy-3-methyl-5-t-butylphenoxy)-6-(n - octylthio) - 1,3,5 - triazine, M.P. 147.5–149°.

2,4-bis-(4-hydroxy-3,5-di-t-butylphenoxy)-6 - (n - dodecylthio)-1,3,5-triazine may be prepared according to the following procedure. To a stirred solution at 5 to 8° of 18.4 parts of cyanuric chloride and 20.2 parts of n-dodecylmercaptan in 100 parts by volume of acetone under nitrogen are added dropwise 8 parts of 50% sodium hydroxide over a 15 minute period. There is then added 45.8 parts of 97% 2,6-di-t-butylhydroquinone and the resulting mixture stirred at 10° while adding 16 parts of 50% sodium hydroxide in a dropwise fashion over 30 minutes. The mixture is stirred an additional hour and the pH adjusted to 5.5 with concentrated hydrochloric acid. The solvent is removed under reduced pressure and the residue dissolved in 200 parts by volume of boiling isopropyl alcohol. After filtering, 15 parts of water are added. The product, which crystallized slowly, is collected by filtration, washed with 80% isopropyl alcohol, air dried and sequentially recrystallized from isopropyl alcohol/water, petroleum ether and isopropyl alcohol/water. A melting point of 95–98° initially drops to 55–58° upon a further recrystallization from hexane but upon standing two weeks rises to 97–98°.

In a similar fashion by using n-butylmercaptan and employing methanol in place of isopropyl alcohol as the isolation solvent, there is obtained 2,4-bis-(4-hydroxy-3,5-di-t-butylphenoxy)-6-(n-butylthio)-1,3,5 - triazine, M.P. 189–191°.

By utilizing n-octadecylmercaptan, there is obtained 2,4-bis-(4-hydroxy-3,5-di-t-butylphenoxy)-6-(n - octadecylthio)-1,3,5-triazine, M.P. 63–64°. When the temperature is raised very slowly, a melting point of 82° is observed.

The above compounds may also be advantageously prepared by initially introducing two moles of the appropriate hydroquinone and then introducing one mole of the appropriate mercaptan.

EXAMPLE 16

*6-(4-hydroxy-3,5-di-t-butylanilino)-*
*2-(n-octylthio)-4-penylthio-1,3,5-triazine*

(a) *6-(4-hydroxy-3,5-di-t-butylanilino) - 4 - (n - octylthio)-2-chloro-1,3,5-triazine.*—An alcoholic solution of sodium n-octylmercaptide, prepared by dissolving 0.23 parts of sodium in 10 parts by volume of ethanol and adding 1.46 parts of n-octylmercaptan, is added rapidly to a slurry of 3.69 parts of 6-(4-hydroxy-3,5-di-t-butylanilino)-2,4-dichloro-1,3,5-triazine in 10 parts by volume of ethanol. The immediate exothermic reaction is controlled with external cooling and the reaction mixture is then poured into 50 parts by volume of water. The oil which separates solidifies upon cooling and 6-(4-hydroxy-3,5-di-t-butylanilino)-4-(n-octylthio-2-chloro-1,3,5 - triazine thus obtained, is collected by filtration, washed with water until free of chloride ion, and recrystallized twice from hexane, M.P. 119–129°.

(b) *6-(4-hydroxy-3,5dit-butylanilino) - 2 - (n - octylthio)-4-phenylthio-1,3,5-triazine.*—To a solution of 6.55 parts of 6 - (4 - hydroxy-3,5-di-t-butylanilino)-4-(n-octylthio)-2-chloro-1,3,5-triazine in 50 parts by volume of warm ethanol is added sodium phenylmercaptide, prepared from 1.65 parts of thiophenol dissolved in a previously prepared solution of 0.32 part of sodium metal in 120 parts by volume of ethanol. The reaction mixture is allowed to stand for 2 hours at which time the pH is 7.0. The salt is removed by filtration and the ethanol solution is treated with steam and extracted with ether. The dried ethereal extracts are concentrated under reduced pressure and the yellow resin resulting is recrystallized from isopropanol/water to yield crystalline 6-(4-hydroxy-3,5-di-t-butylanilino)-2-(octylthio)-4 - phenylthio - 1,3,5-triazine, M.P. 99–101°.

Similarly 9.58 parts of 6-(4-hydroxy-3,5-di-t-butylanilino)-4-(n-octylthio)-2-chloro - 1,3,5- triazine are allowed to react with 4.44 parts of 2,6-di-t-butyl-1,4-hydroquinone to yield 6-(4-hydroxy-3,5-di-t-butylanilino)-4-(4-hydroxy-3,5-di-t-butylphenoxy) - 2 - (n - octylthio)-1,3,5-triazine, which is recrystallized from n-heptane, M.P. 182–183°.

EXAMPLE 17

*6-(4-hydroxy-3,5-di-t-butylphenoxy)-*
*2,4-bis-(phenoxy)-1,3,5-triazine*

Six parts of 2,4-bis-(phenoxy)-6-chloro-1,3,5-triazine dissolved in ethanol are allowed to react with a solution of 4.4 parts of 2-6-di-t-butyl-1,4-hydroquinone in sodium ethoxide which is previously prepared by dissolving sodium metal (0.46 part) in 30 parts by volume of ethanol. After removal of the sodium chloride formed, the filtrate is flooded with water and the resulting solid is washed with water, collected by filtration, dried and recrystallized from hexane to yield 6-(4-hydroxy-3,5-di-t-butylphenoxy)-2,4-bis-(phenoxy) - 1,3,5 - triazine, M.P. 145–147°.

EXAMPLE 18

*2,4,6-tris-(4-hydroxy-3,5-*
*di-t-butylphenoxy)-1,3,5-triazine*

To a solution of 3.68 parts of cyanuric chloride dissolved in 50 parts by volume of acetone cooled to 20° are added 13.3 parts of 2,6-di-t-butyl-1,4-hydroquinone. The resultant mixture is stirred for 1 hour at 20°, during which time 12 parts of 5 N sodium hydroxide in 50 parts of water are added dropwise. The reaction mixture is then heated for 30 minutes at 60° and 50 parts of water are added. The reaction mixture is heated for an additional hour at 70° until a pH of 7.0 is obtained. After cooling, the solid which forms is collected by filtration, repeatedly washed with water, recrystallized from boiling dioxane and water and dried under reduced pressure at 125° to yield 2,4,6-tris-(4-hydroxy-3,5-di-t-butylphenoxy)-1,3,5-triazine, M.P. 298–299°.

By employing 9.2 parts of cyanuric chloride and 27.5 parts of mono-t-butyl-1,4-hydroquinone in this procedure, there is obtained 2,4,6-tris-(3-t-butyl-4-hydroxyphenoxy)-1,3,5-triazine, M.P. 128–134°.

Similarly by substituting a molar equivalent amount of 2-methyl-6-t-butylhydroquinone, there is obtained 2,4,6-tris-(4-hydroxy-3-methyl - 5 - t - butylphenoxy) - 1,3,5-triazine, M.P. 271–275°.

EXAMPLE 19

*6-(4-hydroxy-3,5-di-t-butylphenoxy)-*
*2,4-bis-(n-octylthioethylthio)-1,3,5-triazine*

(a) *6-(4-hydroxy-3,5-di-t-butylphenoxy)-2,4-dichloro-1,3,5-triazine.*—To a stirred solution of 18.4 parts of cyanuric chloride dissolved in 250 parts by volume of acetone cooled to 5° are added 22.2 parts of 2,6-di-t-butyl-1,4-hydroquinone. Twenty parts by volume of 5 N sodium hydroxide in 250 parts by volume of water are then added dropwise with stirring over a period of 30 minutes at 5° and stirring is continued for a further 30 minutes at 5°. Two hundred and fifty parts by volume of water are next added and the reaction mixture stirred at 5° for 3 hours. The solid precipitate which forms is filtered, washed with ice-water and dried in vacuo to yield the intermediate 6 - (4 - hydroxy - 3,5 - di-t-butylphenoxy)-2,4-dichloro-1,3,5-triazine, which can be recrystallized from warm isopropanol to yield crystalline material, M.P. 103–104°.

(b) *6-(4-hydroxy-3,5-di-t-butylphenoxy)-2,4 - bis-(n-octylthioethylthio)-1,3,5-triazine.*—To a solution of 1.38 parts of sodium metal in 75 parts by volume of ethanol are added 13.0 parts of n-octylthioethylmercaptan. This solution is rapidly added to a stirred solution of 12.6 parts of crude 6-(4-hydroxy-3,5-di-t-butylphenoxy)-2,4-(dichloro)-1,3,5-triazine in 75 parts by volume of ethanol. The initial reaction is exothermic, and the reaction mixture is heated and stirred under nitrogen for 15 minutes until the pH is 7.0. The reaction mixture is then treated with steam and the resulting yellow oil extracted into 100 parts by volume of hexane. These hexane extracts, after drying over magnesium sulfate, are adsorbed on a silica gel column and the product, 6-(4-hydroxy-3,5-di-t-butylphenoxy)-2,4-bis-(n-octylthioethylthio)-1,3,5-triazine, is eluted with 50% benzene in hexane and isolated as a resinous oil by evaporation.

Calc. for $C_{37}H_{63}O_2S_4N_3$: C, 62.56; H, 8.94; N, 5.92; S, 18.06. Found: C, 62.30; H, 8.65; N, 5.89; S, 18.37.

In a similar fashion by employing 2-t-butylhydroquinone, there is obtained 6-(4-hydroxy-3-t-butylphenoxy)-2,4-bis-(n-octylthioethylthio)-1,3,5-triazine as a water insoluble oil which gives the following analysis:

Calc. for $C_{33}H_{55}O_2N_3S_4$: S, 19.61. Found: S, 19.75, 19.46.

Alternatively, the above compounds can advantageously be prepared by treating one mole of cyanuric chloride with two moles of the appropriate mercaptan in the presence of base and then treating the resultant 2,4-di-(alkylthio-(lower)alkylthio)-6-chloro-1,3,5-triazine with one mole of the appropriate hydroquinone.

EXAMPLE 20

*6-(4-hydroxy-3,5-di-t-butylphenoxy)-2,4-bis-(n-*
*dodecylthioethylthio)-1,3,5-triazine*

(a) *n-Dodecylthioethylmercaptan.*—A solution of 88.8 parts of n-dodecylmercaptan and 23.7 parts of sodium methylate in 135 parts by volume of ethanol is stirred under nitrogen while 35.4 parts of 2-chloroethanol are added dropwise at 40–50° over 15 minutes. The reaction is then refluxed with stirring for 1 hour, cooled to room temperature and the solid removed by filtration. The solvent is removed from the filtrate under reduced pressure and 33.4 parts of thiourea and 130 parts of concentrated hydrochloric acid are added. The reaction is refluxed with stirring under nitrogen for 2½ hours and allowed to stand overnight at normal room temperature. The solid mass which separates upon cooling is reheated to boiling and 50 parts of sodium hydroxide in 550 parts by volume of water are added. Refluxing is continued for 2½ hours after which the reaction is acidified with 5–10 parts by volume of concentrated hydrochloric acid and cooled to room temperature. The oily layer is separated and the aqueous layer extracted two times with 125 parts by volume of ether. These ethereal extracts are combined with the oil, washed two times with 250 parts by volume of water, dried over magnesium sulfate and evaporated. The residue is vacuum distilled to yield the desired n-dodecylthioethylmercaptan, B.P. 119–121°/0.010 mm.

Calc. for $C_{14}H_{30}S_2$: C, 64.06; H, 11.52; S, 24.43. Found: C, 64.07; H, 11.61; S, 24.15.

(b) *6-(4-hydroxy-3,5-di-t-butylphenoxy)-2,4 - bis-(n-dodecylthioethylthio)-1,3,5-triazine.*—A solution of 9.2 parts of cyanuric chloride and 26.2 parts of n-dodecylthioethylmercaptan in 100 parts by volume of acetone is stirred under nitrogen at 5–8° while 8.0 parts of 50% sodium hydroxide are added dropwise over 30 minutes. 2,6-di-t-butylhydroquinone (11.1 parts) are then added and the reaction stirred at 12° while adding 4.0 parts of 50% sodium hydroxide dropwise over 15 minutes. Stirring is continued for 1 hour without cooling after which, the PH is adjusted to 5.5 with concentrated hydrochloric acid. The solvent is removed under reduced pressure, the residual oil boiled with 300 parts by volume of ethanol, the salt filtered and the filtrate allowed to cool slowly, adding a few drops of ethyl acetate to prevent oiling. The product thus formed is cooled, collected by filtration, washed with cold ethanol, air dried and recrystallized twice from ethanol to yield 6-(4-hydroxy-3,5-di-t-butylphenoxy)-2,4-bis-(n-dodecylthioethylthio) - 1,3,5 - triazine, M.P. 44–46°.

Calc. for $C_{45}H_{79}S_4O_2N_3$: C, 65.70; H, 9.68; N, 5.11; S, 15.6. Found. C, 65.64; H, 9.65; N, 5.41; S, 15.78.

6-(4-hydroxy-3,5-di-t-butylphenoxy)-2,4-bis - (n-octylthiopropylthio)-1,3,5-triazine may be similarly prepared as follows:

A solution of 9.2 parts of cyanuric chloride and 22.0 parts of n-octylthiopropylmercaptan (prepared as in Example 21) in 200 parts by volume of acetone are stirred under a nitrogen atmosphere at 0–5° while 8.0 parts of 50% sodium hydroxide are added dropwise over 25 minutes. Stirring is continued for 30 minutes at 5° and 11.1 parts of 2,6-di-t-butylhydroquinone are added, followed by an additional 4.0 parts of 50% sodium hydroxide dropwise over 15 minutes at 5–10°. The reaction is stirred for 1 hour at 10°, the pH adjusted to 5 with concentrated hydrochloric acid and allowed to stand overnight at room temperature. The solvent is then removed under reduced pressure, the residual oil dissolved in 150 parts by volume of hexane and filtered to remove the salt and the hexane evaporated under reduced pressure. The last traces of solvent are removed at 100°/100 mm. and the product filtered to remove a small amount of turbidity. There is thus obtained 6-(4-hydroxy-3,5-di-t-butylphenoxy)-4,6-bis-(n-octylthiopropylthio)-1,3,5-triazine.

Calc. for $C_{39}H_{67}O_2N_3S_4$: S, 17.38. Found: S, 17.20.

EXAMPLE 21

*2,4-bis-(4-hydroxy-3,5-di-t-butylphenoxy)-6-(n-octylthiopropylthio)-1,3,5-triazine*

(a) *n-Octylthiopropylchloride.*—A solution of 157.45 parts of 1-chloro-3-bromopropane in 200 parts by volume of ethanol is stirred under nitrogen while adding a solution of 150.2 parts of 97% n-octylmercaptan and 54.03 parts of sodium methylate in 250 parts by volume of ethanol over 30 minutes, keeping the temperature below 50°. The reaction mixture is then refluxed for 1 hour and the solvent removed under reduced pressure. The residue is distilled at 84–86°/0.005 mm. to yield n-octyl thiopropyl chloride, $n_D^{25}$ 1.4750.

Calc. for $C_{11}H_{23}SCl$: C, 59.25; H, 10.4; Cl, 15.92. Found: C, 59.15; H, 10.19; Cl, 16.01.

(b) *n-Octylthiopropylmercaptan.*—A solution of 111.4 parts of n-octylthiopropyl chloride and 38.0 parts of thiourea in 100 parts by volume of Cellosolve is refluxed for 3 hours, allowed to cool to room temperature, diluted with 300 parts by volume of water containing 40 parts of 50% sodium hydroxide and refluxed for an additional 3 hours. After cooling to room temperature, an additional 300 parts by volume of water are added and the oil extracted with 500 parts by volume of ether. These extracts are washed two times with 250 parts of water and dried over magnesium sulfate. The ether is removed under reduced pressure and the product distilled at 84°/0.010 mm. $n_D^{25}$ 1.4926.

Calc. for $C_{11}H_{24}S_2$: C, 59.24; H, 10.97; S, 29.10. Found: C, 60.29; H, 10.69; S, 28.54.

By employing an equivalent amount of 1-chloro-6-bromohexane in the procedure of part (a) of this example and thereafter executing the procedure of part (b), there is obtained n-octylthiohexylmercaptan.

(c) *2,4-bis-(4-hydroxy-3,5-di-t-butylphenoxy) - 6 - (n octylthiopropylthio)-1,3,5-triazine.*—A solution of 9.2 parts of cyanuric chloride and 11.0 parts of n-octylthiopropylmercaptan in 200 parts by volume of acetone is stirred under nitrogen at 0–5° while 4.0 parts of 50% sodium hydroxide are added dropwise over 30 minutes. 2,6-di-t-butylhydroquinone (22.2 parts) is then added and stirring is continued at 10° while 8.0 parts of 50% sodium hydroxide are added over 30 minutes. Stirring is continued for an additional hour at 10°, the pH adjusted to 5.5 with concentrated hydrochloric acid and the solvent removed under reduced pressure. The residue is dissolved in 150 parts by volume of boiling isopropyl alcohol and filtered to remove the salt, after which 15 parts by volume of water are added. Upon cooling, the product crystallizes and this is collected by filtration, washed with 100 parts by volume of 75% isopropyl alcohol, air dried and recrystallized several times from petroleum ether to yield 2,4 - bis-(4-hydroxy-3,5-di-t-butylphenoxy)-6-(n-octylthiopropylthio)-1,3,5-triazine.

Calc. for $C_{42}H_{65}O_4N_3S_2$: C, 68.16; H, 8.85; N, 5.68; S, 8.67. Found: C, 68.14; H, 8.87; N, 5.60; S, 8.70.

In a similar fashion, 2,4-bis-(4-hydroxy-3,5-di-t-butylphenoxy)-6-(n-octylthiohexylthio)-1,3,5-triazine is obtained by substituting an equivalent amount of n-octylthiohexylmercaptan for n-octylthiopropylmercaptan in this procedure.

Likewise by employing an equivalent amount of n-dodecylthioethylmercaptan, there is obtained 2,4-bis-(4-hydroxy - 3,5 - di-t-butylphenoxy)-6-(n-dodecylthioethylthio)-1,3,5-triazine, which after recrystallization from isopropyl alcohol demonstrates a melting point of 91–93°.

Similarly the use of n-octylthioethylmercaptan in equivalent amounts yields 2,4-bis-(4-hydroxy-3,5-di-t-butylphenoxy)-6-(n-octylthioethylthio) - 1,3,5 - triazine, which after recrystallization from ethanol/water demonstrates a melting point of 94–95°.

By substituting 88 parts of n-octylthioethylmercaptan for n-dodecylmercaptan in the procedure of part (a) of Example 20, there is obtained n-octylthioethylthioethylmercaptan which when resubjected to the identical procedure in equivalent amounts yields n-octylthioethylthioethylthioethylmercaptan. Substitution of this latter compound in the procedure of part (c) of this example then yields 2,4-bis-(4-hydroxy-3,5-di-t-butylphenoxy)-6-(n-octylthioethylthioethylthioethylthio)-1,3,5-triazine while substitution of the former yields 2,4-bis-(4-hydroxy-3,5-di-t-butylphenoxy) - 6 - (n-octylthioethylthioethylthio)-1,3,5-triazine, M.P. 94–97°.

EXAMPLE 22

*2,4-bis-(4-hydroxy-3,5-di-t-butylphenoxy)-6-(n-dodecylamino)-1,3,5-triazine*

A solution of 11.12 parts of 2,4-bis-(4-hydroxy-3,5-di-t-butylphenoxy)-6-chloro-1,3,5-triazine and 3.7 parts of n-dodecylamine in 100 parts by volume of acetone is stirred until the exothermic reaction has subsided and 3.8 parts by volume of 5.29 N sodium hydroxide are added dropwise with stirring over 5 minutes. Stirring is continued for 2 hours after which 40 parts by volume of water are added. The solid product is collected by filtration, washed with water, air dried and sequentially recrystallized from ethanol, heptane and hexane/ethyl acetate to yield the product, M.P. 177–180°.

Calc. for $C_{43}H_{68}O_4N_4$: C, 73.24; H, 9.72; N, 7.95. Found: C, 73.16; H, 9.71; N, 7.95.

By employing equivalent amounts of dimethylamine, di-(2-ethylhexyl)amine and dibutylamine in the above procedure there are respectively obtained, 2,4-bis-(4-hydroxy-3,5-di-t-butylphenoxy)-6-dimethylamino-1,3,5-triazine, M.P. 244–246°; 2,4-bis-(4-hydroxy-3,5-di-t-butylphenoxy)-6-(di-2-ethylhexylamino)-1,3,5-triazine, M.P. 130–132°; and 2,4-bis-(4-hydroxy-3,5-di-t-butylphenoxy)-6-dibutylamino-1,3,5-triazine, M.P. 193–194°.

In a similar fashion, by passing anhydrous ammonia through an anhydrous solution of 2,4-bis-(4-hydroxy-3,5-di-t-butylphenoxy)-6-chloro-1,3,5-triazine, there is obtained 2,4-bis-(4-hydroxy-3,5-di-t-butylyphenoxy)-6-amino-1,3,5-triazine which after recrystallization from benzene melts at 289–291°.

EXAMPLE 23

Unstabilized polypropylene powder (Hercules Profax 6501) is thoroughly blended with 0.5% by weight of the following compounds of this invention and milled on a two-roller mill at 182° for 10 minutes, after which time the stabilized polypropylene is sheeted from the mill and allowed to cool.

The milled polypropylene sheet is cut into small pieces and pressed for from 5–10 minutes on a hydraulic press at 218° and 175 pounds per square inch pressure. The resultant sheet of 25 mil thickness is then tested for resistance to accelerated aging in a forced draft oven at 149°. The unstabilized polypropylene deteriorates after 3 hours. The following table presents representative oven lives for polypropylene stabilized by various compounds of the present invention.

| Compound | Hours to failure |
|---|---|
| 6-(4-hydroxy-3-methyl-5-t-butylanilino)-2,4-bis-(n-octylthio)-1,3,5-triazine | 515 |
| 6-(4-hydroxyanilino)-2,4-bis-(n-octylthio)-1,3,5-triazine | 340 |
| 6-(4-hydroxy-3,5-dimethylanilino)-2,4-bis-(n-octylthio)-1,3,5-triazine | 515 |
| 6-(4-hydroxy-3,5-di-t-butylanilino)-2,4-bis-(n-octylthioethylthio)-1,3,5-triazine | 705 |
| 6-(4-hydroxyphenoxy)-2,4-bis-(n-octylthio)-1,3,5-triazine | 750 |
| 2,4-bis-(4-hydroxy-3,5-di-t-butylphenoxy)-6-(n-octylthio)-1,3,5-triazine | 805 |
| 2,4-bis-(4-hydroxy-3-t-butylphenoxy)-6-(n-octylthio)-1,3,5-triazine | 940 |
| 6-(4-hydroxy-3,5-di-t-butylanilino)-2,4-bis-(phenoxy)-1,3,5-triazine | 380 |
| 6-(4-hydroxy-3,5-di-t-butylanilino)-4-(4-hydroxy-3,5-di-t-butylphenoxy)-2-(n-octylthio)-1,3,5-triazine | 610 |
| 2,4,6-tris-(4-hydroxy-3,5-di-t-butylphenoxy)-1,3,5-triazine | 180 |
| 6-(4-hydroxy-3,5-di-t-butylphenoxy)-2,4-bis-(n-octylthioethylthio)-1,3,5-triazine | 1600 |
| 6-(4-hydroxy-3,5-di-t-butylanilino)-2,4-bis-(n-octylthio)-1,3,5-triazine | 375 |
| 6-(4-hydroxy-3-methylphenoxy)-2,4-bis-(n-octylthio)-1,3,5-triazine | 974 |
| 6-(4-hydroxy-3-t-butylphenoxy)-2,4-bis-(n-octylthioethylthio)-1,3,5-triazine | 1745 |
| 6-(4-hydroxy-3-methyl-5-t-butylphenoxy)-2,4-bis-(n-octylthio)-1,3,5-triazine | 860 |
| 2,4-bis(4-hydroxy-3-methyl-5-t-butyl-phenoxy)-6-(n-octylthio)-1,3,5-triazine | 1530 |
| 2,4,6-tris-(4-hydroxy-3-methyl-5-t-butylphenoxy)-1,3,5-triazine | 45 |
| 2,4-bis-(4-hydroxy-3,5-di-t-butylphenoxy)-6-amino-1,3,5-triazine | 655 |
| 2,4-bis-(4-hydroxy-3,5-di-t-butylphenoxy)-6-dimethylamino-1,3,5-triazine | 620 |
| 2,4-bis-(4-hydroxy-3,5-di-t-butylphenoxy)-6-dodecylamino-1,3,5-triazine | 715 |
| 2,4-bis-(4-hydroxy-3,5-di-t-butylphenoxy)-6-(di-2-ethylhexyl)amino-1,3,5-triazine | 730 |
| 2,4-bis-(4-hydroxy-3,5-di-t-butylphenoxy)-6-dibutylamino-1,3,5-triazine | 585 |
| 2.4-bis-(4-hydroxy-3,5-di-t-butylanilino)-6-(n-octylthio)1,3,5-triazine | 300 |
| 6-(4-hydroxy-3,5-di-t-butylphenoxy)-2,4-bis-(n-octylthiopropylthio)-1,3,5-triazine | 2010 |
| 6-(4-hydroxy-3,5-di-t-butylphenoxy)-2,4-bis-(n-dodecylthioethylthio)-1,3,5-triazine | 1570 |
| 2,4-bis-(4-hydroxy-3,5-di-t-butylphenoxy)-6-butylthio-1,3,5-triazine | 695 |
| 2,4-bis-(4-hydroxy-3,5-di-t-butylphenoxy)-6-(n-octadecylthio)-1,3,5-triazine | 1500 |
| 2,4-bis-(4-hydroxy-3,5-di-t-butylphenoxy)-6-(n-dodecylthio)-1,3,5-triazine | 893 |
| 2,4-bis-(4-hydroxy-3,5-di-t-butylphenoxy)-6-(n-octylthiopropylthio)-1,3,5-triazine | 1465 |
| 2,4-bis-(4-hydroxy-3,5-di-t-butylphenoxy)-6-(n-octylthioethylthio)-1,3,5-triazine | 825 |
| 2,4-bis-(4-hydroxy-3,5-di-t-butylphenoxy)-6-(n-dodecylthioethylthio)-1,3,5-triazine | 1450 |

Similarly compositions of polyethylene, polystyrene and the like are highly stabilized by the compounds of this invention.

EXAMPLE 24

A stabilized mineral oil composition is prepared by incorporating 0.005% by weight of total compositions of the stabilizer 6-(4-hydroxy-3,5-di-t-butylanilino)-2,4-bis-(n-octylthio)-1,3,5-triazine in white mineral oil, U.S.P. The mixture is heated for 5 hours at 115° in the presence of air. A similar amount of unstabilized mineral oil is also heated for 5 hours at 115°. The stabilized mineral oil is odorless, while the unstabilized mineral oil exhibits a strong odor.

EXAMPLE 25

A stabilized gasoline is prepared by incorporating into Texas cracked gasoline having no additives therein, 0.05% by weight of 6-(4-hydroxy-3,5-di-t-butylanilino)-2,4-bis-(n-octylthio)-1,3,5-triazine. The gasoline is tested by the oxygen bomb induction period method (ASTM D525–55). Gasoline containing stabilizer fails after 65 hours, whereas the blank fails after 4 hours.

EXAMPLE 26

Stabilized lard is prepared by incorporating in lard 0.01% by weight of 6-(4-hydroxy-3,5-di-t-butylanilino)-2,4-bis-(n-octylthio)-1,3,5-triazine. Air is bubbled through both the stabilized and the unstabilized lard for 25.5 hours at 100°. The peroxide value of the stabilized lard after this aeration is 28, while the unstabilized lard has a peroxide value of 556.

EXAMPLE 27

A stabilized high temperature lubricating oil is prepared by incorporating 2% by weight of 6-(4-hydroxy-3,5-di-t-butylanilino)-2,4-bis-(n-octylthio)-1,3,5-triazine into diisoamyladipate (Rohm & Haas, Plexol 268). The stabilized composition is compared with the unstabilized lubricant by heating at 175° in the presence of air and metallic catalysts according to the test method described in Military Specification Mil–L–7808c. After 72 hours the blank contains 83% sludge and has increased very greatly in viscosity. The stabilized lubricant, however, is very slightly less viscous than originally and contains less than 1% of sludge.

EXAMPLE 28

Heptaldehyde is stabilized by incorporating into the freshly distilled aldehyde 0.01% by weight of 6-(4-hydroxy-3,5-di-t-butylanilino)-2,4-bis - (n-octylthio) - 1,3,5-triazine. The stabilized heptaldehyde is shaken in an oxygen atmosphere under normal pressure at room temperature (23°). The time necessary for absorption of 30 parts by volume of oxygen in 25 parts of heptaldehyde is 11 hours for the stabilized heptaldehyde, compared with 15 minutes for heptaldehyde alone.

EXAMPLE 29

Cyclohexene, freshly distilled, is stabilized by addition thereto of 0.001% by weight 6-(4-hydroxy-3,5-di-t-butylanilino)-2,4-bis-(n-octylthio)-1,3,5-triazine. The effectiveness of this stabilizer in cyclohexene is tested by the ASTM D525–55 oxidation test with the modification that only 10 parts by volume of cyclohexene are used in each bomb. The stabilized cyclohexene runs 90 minutes to failure, while unstabilized cyclohexene fails after 35 minutes.

EXAMPLE 30

Paraffin wax is stabilized by incorporating therein 0.001% by weight of 6-(4-hydroxy-3,5-di-t-butylanilino)-2,4-bis-(n-octylthio)-1,3,5-triazine. The effective stabilization is evidenced by odor formation. After 20 hours there is no perceptible odor for the stabilized wax whereas unstabilized wax exhibits a distinct odor.

EXAMPLE 31

6-(4-hydroxy-3,5 - di-t-butylphenoxy) - 2,4 - dichloro-1,3,5-triazine, prepared according to Example 19, is treated with stoichiometrically equivalent amounts of appropriately-substituted phenols by the procedure of Example 17 and the following additional stabilizers are prepared:

6-(4-hydroxy-3,5-di-t-butylphenoxy)-2,4-bis-(4-methylphenoxy)-1,3,5-triazine,
6-(4-hydroxy-3,5-di-t-butylphenoxy)-2,4-bis-(4-bis-(4-t-butylphenoxy)-1,3,5-triazine,
6-(4-hydroxy-3,5-di-t-butylphenoxy)-2,4-bis-(4-octylphenoxy)-1,3,5-triazine,
6-(4-hydroxy-3,5-di-t-butylphenoxy)-2,4-bis-(4-dodecylphenoxy)-1,3,5-triazine,
6-(4-hydroxy-3,5-di-t-butylphenoxy)-2,4-bis-(2,4-didodecylphenoxy)-1,3,5-triazine.

In a similar manner 2,4-bis-(4-hydroxy-3,5-di-t-butylphenoxy)-6-chloro-1,3,5-triazine is reacted with the appropriate phenols and there are obtained the following stabilizers:

2,4-bis-(4-hydroxy-3,5-di-t-butylphenoxy)-6-(phenoxy)-1,3,5-triazine,
2,4-bis-(4-hydroxy-3,5-di-t-butylphenoxy)-6-(4-methylphenoxy)-1,3,5-triazine,
2,4-bis-(4-hydroxy-3,5-di-t-butylphenoxy)-6-(4-t-butylphenoxy)-1,3,5-triazine,
2,4-bis-(4-hydroxy-3,5-di-t-butylphenoxy)-6-(4-octylphenoxy)-1,3,5-triazine,
2,4-bis-(4-hydroxy-3,5-di-t-butylphenoxy)-6-(4-t-dodecylphenoxy)-1,3,5-triazine,
2,4-bis-(4-hydroxy-3,5-di-t-butylphenoxy)-6-(2,4-didodecylphenoxy)-1,3,5-triazine.

What is claimed is:
1. Compounds of the formula:

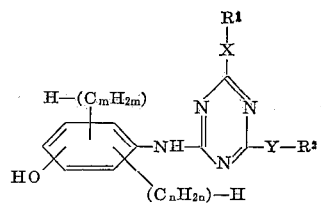

wherein $R^1$ and $R^2$ are each

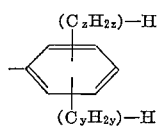

and each of X and Y is selected from the group consisting of —O—, —S— and

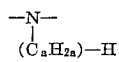

in which each of $n$, $m$, $z$ and $y$ has a value of from 0 to 12 and $a$ has a value of from 0 to 30.

2. Compounds of the formula:

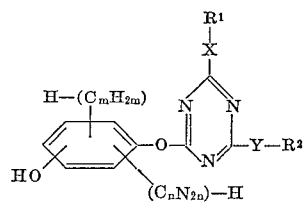

wherein $R^1$ and $R^2$ are each

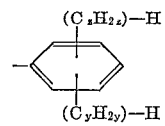

and each of X and Y is selected from the group consisting of —O—, —S— and

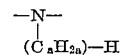

in which each of $n$, $m$, $z$ and $y$ has a value of from 0 to 12, and $a$ has a value of from 0 to 30.

3. Compounds of the formula:

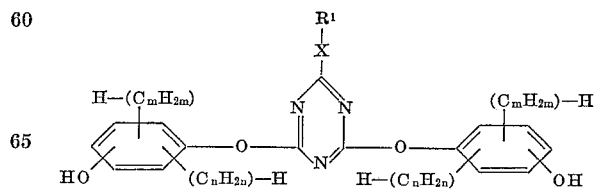

wherein $R^1$ is

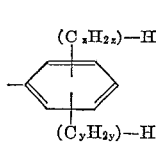

and each of X and Y is selected from the group consisting of —O—, S—S and
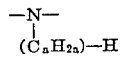
in which each of $n$, $m$, $z$ and $y$ has a value of from 0 to 12, and $a$ has a value of from 0 to 30.
4. 6 - (4 - hydroxy-3,5-di-t-butylanilino)-2,4-bis-(phenoxy)-1,3,5-triazine.
References Cited by the Examiner
UNITED STATES PATENTS
2,387,547 10/1945 Widmer et al. __ 260—249.5 X
2,481,155 9/1949 Schaefer _____ 260—249.5 X
WALTER A. MODANCE, *Primary Examiner.*
JOHN D. RANDOLPH, J. M. FORD,
*Assistant Examiners.*